(12) United States Patent
Donno

(10) Patent No.: US 11,186,385 B2
(45) Date of Patent: Nov. 30, 2021

(54) GROUND MANOEUVERING DEVICE WITH A HYDRAULIC APPARATUS

(71) Applicant: KOPTER GROUP AG, Mollis (CH)

(72) Inventor: Cosimo Donno, Pfungen (CH)

(73) Assignee: kopter group ag, Mollis (CH)

( * ) Notice: Subject to any disclaimer, the term of this patent is extended or adjusted under 35 U.S.C. 154(b) by 491 days.

(21) Appl. No.: 16/260,787

(22) Filed: Jan. 29, 2019

(65) Prior Publication Data

US 2019/0233134 A1 Aug. 1, 2019

(30) Foreign Application Priority Data

Jan. 30, 2018 (CH) .................................... 00105/18

(51) Int. Cl.
*B64F 1/22* (2006.01)
*B66F 5/04* (2006.01)
(Continued)

(52) U.S. Cl.
CPC ................ *B64F 1/22* (2013.01); *B64C 25/32* (2013.01); *B64C 25/52* (2013.01); *B64C 25/66* (2013.01); *B66F 5/04* (2013.01); *B64C 2025/325* (2013.01)

(58) Field of Classification Search
CPC .. B64F 1/22; B64F 1/227; B64F 1/228; B64F 1/10; B64F 1/00; B64F 1/002;
(Continued)

(56) References Cited

U.S. PATENT DOCUMENTS 3,279,722 A * 10/1966 Glover, Jr. ................ B64F 1/22
244/50
4,600,168 A * 7/1986 Selecman ............. B64C 25/001
244/17.17

FOREIGN PATENT DOCUMENTS

CN 106494637 A * 3/2017
CN 106494637 A 3/2017
(Continued)

OTHER PUBLICATIONS

Translation of CN-106494637-B (Year: 2017).*
(Continued)

*Primary Examiner* — Richard R. Green
*Assistant Examiner* — Steven J Shur
(74) *Attorney, Agent, or Firm* — Paul D. Bianco; Fleit Intellectual Property Law

(57) ABSTRACT

A ground manoeuvering device comprises a housing with a fastening device for the skid, a hydraulic apparatus as well as an outer wheel and an inner wheel on two aligned horizontal axles on the hydraulic apparatus, respectively one on the inside and one on the outside beside the skid. The hydraulic apparatus comprises an extendable piston and an engagement shaft with a lever attached in a swivellable manner. When the lever is rocked, the piston is extended from the hydraulic apparatus and thereby lifts the housing vertically upwards. The engagement shaft is aligned in the wheel running direction and the lever extends, in the operating state, in the wheel axle direction of the outer wheel. In addition, the lever comprises a tread section, in order to raise the fastened skid onto the two wheels using the hydraulic apparatus while standing conveniently beside the helicopter repeatedly stepping with the foot on the tread section.

11 Claims, 6 Drawing Sheets

(51) Int. Cl.
*B64C 25/66* (2006.01)
*B64C 25/32* (2006.01)
*B64C 25/52* (2006.01)

(58) Field of Classification Search
CPC ... B64F 1/125; B64C 25/66; B64C 2025/325; B64C 25/001; B64C 25/52; B64C 25/32; B66F 5/00; B66F 5/04
See application file for complete search history.

(56) References Cited

FOREIGN PATENT DOCUMENTS

GB         2042990 A * 10/1980 ............. B64C 25/66
GB         2042990 A     10/1980

OTHER PUBLICATIONS

European Search Report dated Jun. 3, 2019 for Patent No. 19153266.
Search report dated Apr. 26, 2018 for Swiss Application No. 1052018 (3 pages).

* cited by examiner

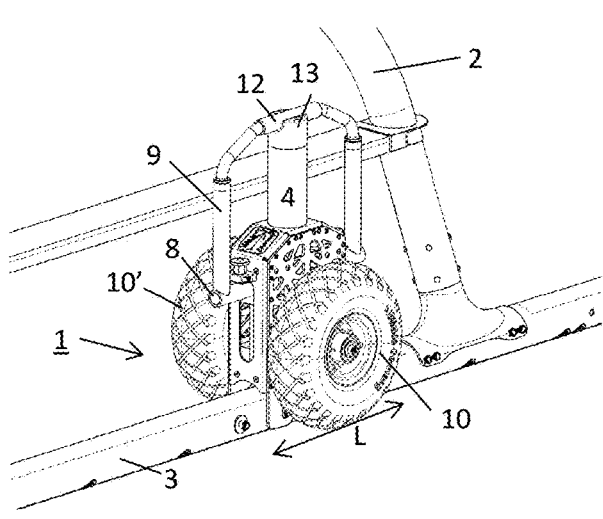
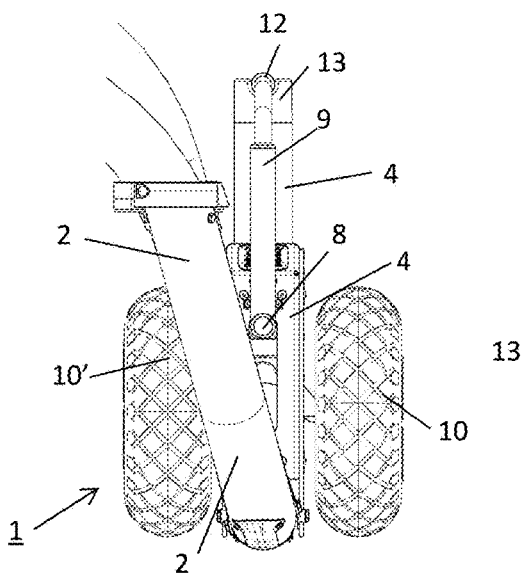
Fig. 7
Fig. 8
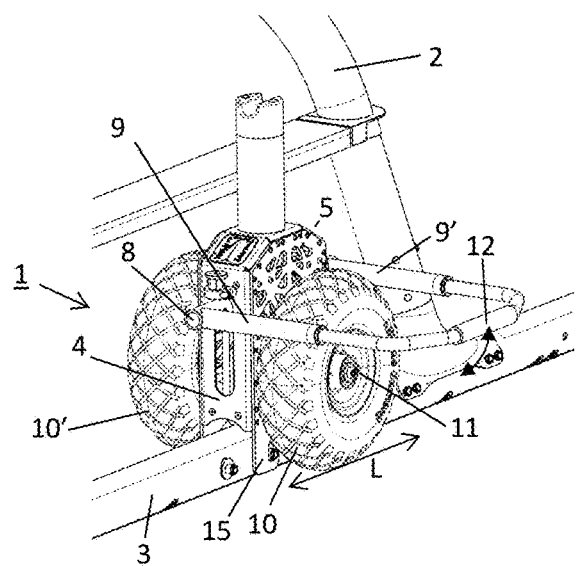
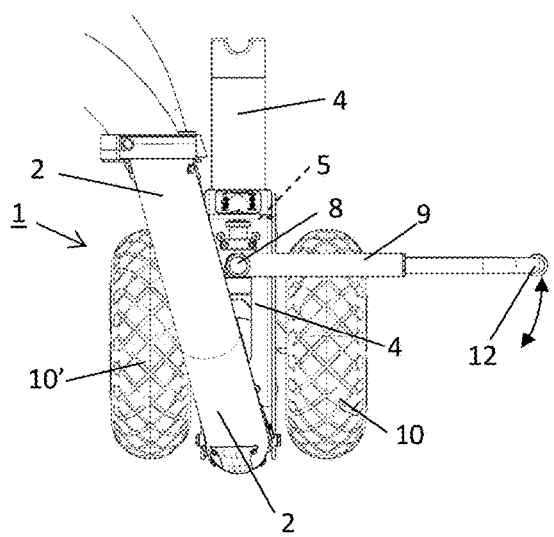
Fig. 9
Fig. 10

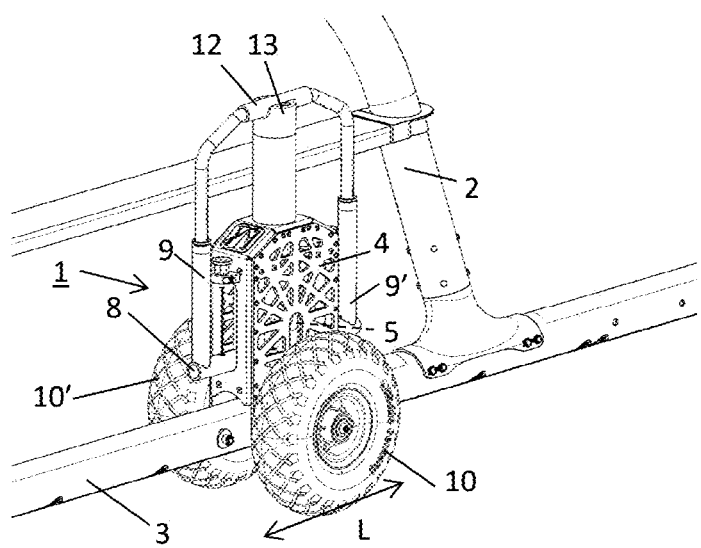
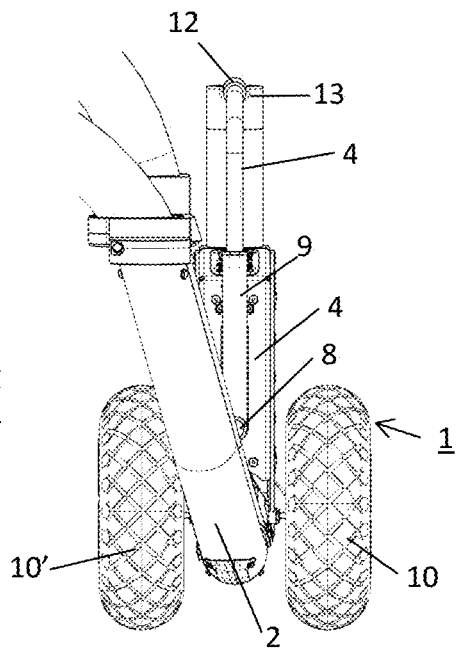
Fig. 11  Fig. 12
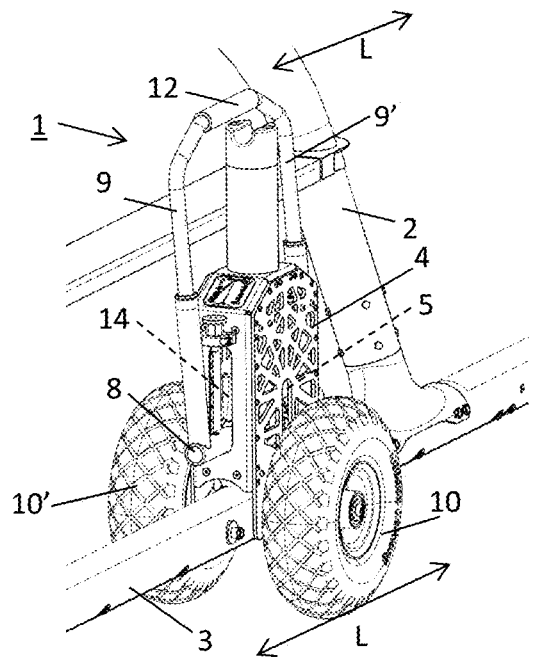
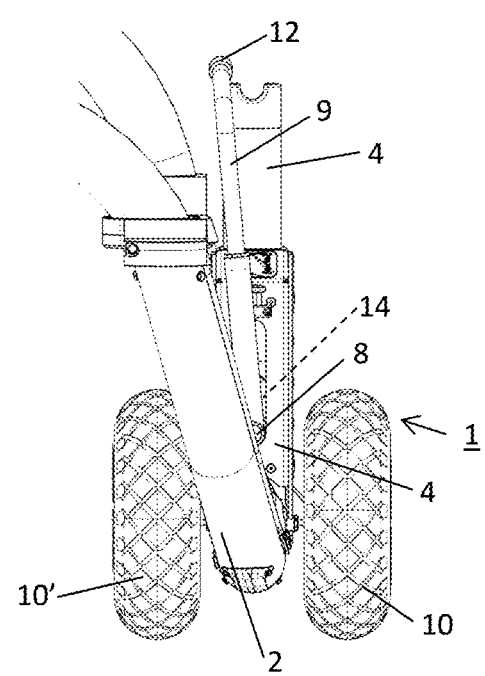
Fig. 13  Fig. 14

GROUND MANOEUVERING DEVICE WITH A HYDRAULIC APPARATUS

TECHNICAL FIELD

The invention relates to a ground manoeuvering device for jacking up in each case a skid of a landing gear of a helicopter, in order to manoeuvre the latter on the ground, comprising a housing with a fastening device, to which a skid can be fastened tension-proof, a hydraulic apparatus with an extendable piston and a first engagement shaft, to which a lever is attached in a swivellable manner for the transmission of a torque, so that the piston is extended from the hydraulic apparatus when the lever is rocked, and wherein the hydraulic apparatus is fitted movably in the housing in such a way that the housing is lifted vertically upwards when the piston is extended, as well as an outer wheel and an inner wheel on two aligned horizontal axles at opposite sides on the hydraulic apparatus, which wheels, after the fastening of the housing to the skid, are arranged beside the latter respectively on the inside and on the outside.

BACKGROUND

Helicopters usually comprise a landing gear, which is equipped with two skids. The latter run parallel to the flight direction and provide the helicopter with a stable position on the ground. For manoeuvring, for example when the helicopter is to be brought into a hanger, it or its travel gear has to be jacked up onto a device suitable for the purpose, referred to here as ground manoeuvering devices.

Various models of ground manoeuvering devices are known. As a rule, they are used in pairs as a set, wherein each skid is jacked up onto one such ground manoeuvering device. The latter comprises, depending on the model, a single wheel or a double wheel, wherein in the case of the latter one wheel is arranged on each side of the skid. Various mechanisms are known that place the skids onto the ground manoeuvering device, in particular electrical, mechanical and hydraulic ones.

The present invention relates to ground manoeuvering devices with a hydraulic apparatus. The known ground manoeuvering devices with a hydraulic apparatus are unfortunately unwieldy to operate, are not user-friendly and are not maintenance-friendly.

SUMMARY OF THE INVENTION

It is the problem of the present invention to describe a ground manoeuvering device with a hydraulic apparatus that is user-friendly.

The problem is solved by the features of the independent claim. Further advantageous embodiments are specified in the sub-claims.

According to the invention, in a ground manoeuvering device mentioned at the outset the engagement shaft is aligned in the wheel running direction and the lever for the operation of the hydraulic apparatus extends, in the operating state, in the wheel axle direction, in the direction of the outer wheel, wherein this lever comprises a tread section, in order to raise the fastened skid onto the two wheels using the hydraulic apparatus while standing conveniently beside the helicopter repeatedly stepping with the foot on the tread section.

The advantage of this invention arises from the fact that the direction in which the operating lever extends for the swivelling motion does not run in a direction parallel to the skids, consequently requiring an operation of the latter usually directly above the skids as in the known ground manoeuvering devices from the prior art, but is aligned perpendicular to the skid. Since the skids are usually arranged at the sides close beside the helicopter, they are very easily accessible from the side. If the lever of the ground manoeuvering device, which has to be operated to raise the piston of the hydraulic system by means of pumping movements, extends perpendicular to the axis of the helicopter, which is defined by its flight direction, said lever can thus be operated conveniently with a foot, while standing beside the helicopter. In contrast, levers which are aligned parallel to the skid have to be operated in a cumbersome manner beneath the helicopter, which is much more awkward.

In a particularly preferred embodiment, this lever can be swivelled over the vertical position in the direction of the inner wheel, as a result of which a drainage valve is opened, which again lowers the skid of the landing gear. No further lever and no other engagement position of the lever needs to be provided for this.

In the dismantled state, the ground manoeuvering device according to the invention can also easily be pulled on its wheels, whereby it is held during running by the lever in the region of or close to the tread section.

BRIEF DESCRIPTION OF THE DRAWINGS

The invention as explained below in greater detail by reference to the drawings. Dashed lines signify that only the approximate location of a component is indicated, but the latter itself cannot be seen. Identical reference numbers always refer to the same components. In the figures:

FIG. 7 shows a perspective representation of a ground manoeuvering device mounted on a landing gear of a helicopter, in the state with a lowered skid;

FIG. 8 shows a representation in front view of a ground manoeuvering device mounted on a landing gear of a helicopter, in the state with a lowered skid;

FIG. 9 shows a perspective view of a ground manoeuvering device mounted on a landing gear of a helicopter, in the operating position for lifting;

FIG. 10 shows a representation in front view of a ground manoeuvering device mounted on a landing gear of a helicopter, in the operating position for lifting;

FIG. 11 shows a perspective representation of a ground manoeuvering device mounted on a landing gear of a helicopter, in the state with a raised skid;

FIG. 12 shows a representation in front view of a ground manoeuvering device mounted on a landing gear of a helicopter, in the state with a raised skid;

FIG. 13 shows a perspective representation of a ground manoeuvering device mounted on a landing gear of a helicopter, in the state with a lowered skid;

FIG. 14 shows a representation in front view of a ground manoeuvering device mounted on a landing gear of a helicopter, in the state with a lowered skid;

WAYS OF PERFORMING THE INVENTION

Figure 1:
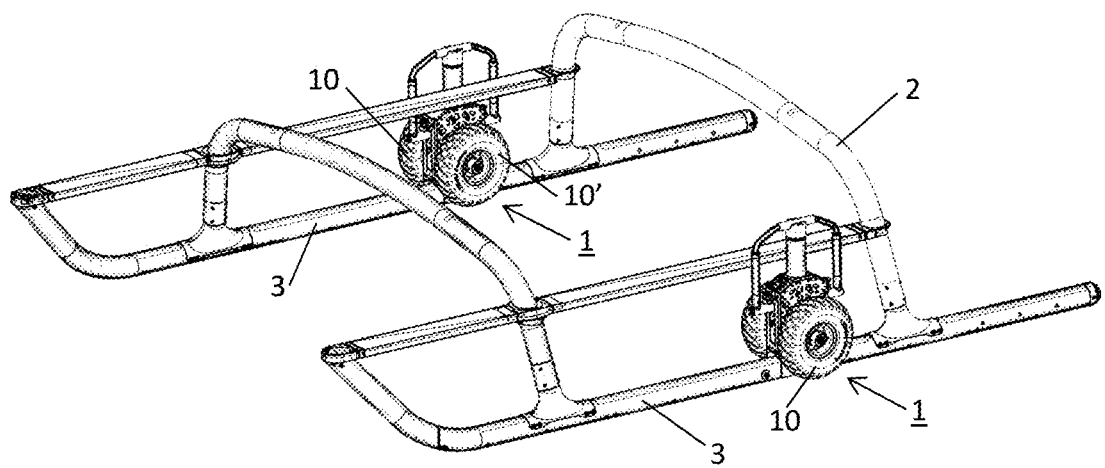
FIG. 1 shows a diagrammatic perspective representation of a landing gear of a helicopter with two ground manoeuvering devices according to the invention.

FIG. 1 shows a diagrammatic perspective representation of a landing gear 2 of a helicopter with two skids 3. A ground manoeuvering device 1 according to the invention is mounted on each of these skids 3. The helicopter itself is not represented for reasons of clarity; its flight direction runs parallel to the skids forwards to the left in the figure.

Figure 2:
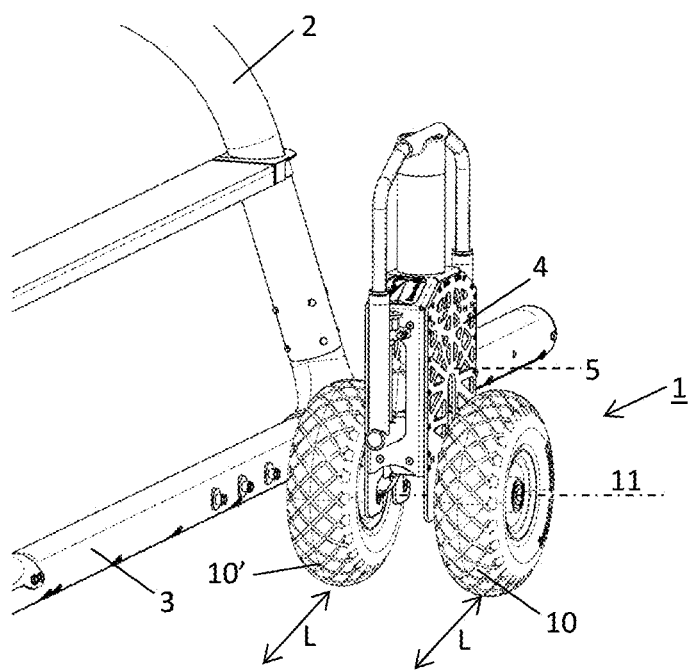
FIG. 2 shows a perspective representation of a ground manoeuvering device beside a landing gear of a helicopter.

FIG. 2 shows a detail of such a landing gear 2 with a skid 3, beside which an unmounted ground manoeuvering device 1 according to the invention is represented with a hydraulic apparatus 5 in a housing 4, an outer wheel 10 and an inner wheel 10'. These wheels 10, 10' have a running direction L and aligned horizontal axles 11 and are arranged on opposite sides of hydraulic apparatus 5. After the fastening of housing 4 to skid 3, inner wheel 10' is located inside landing gear 2, i.e. between the two skids 3, and outer wheel 10 is located outside the latter, i.e. laterally beside skids 3 and beside the helicopter, as can be seen in FIG. 1.

Figure 15:
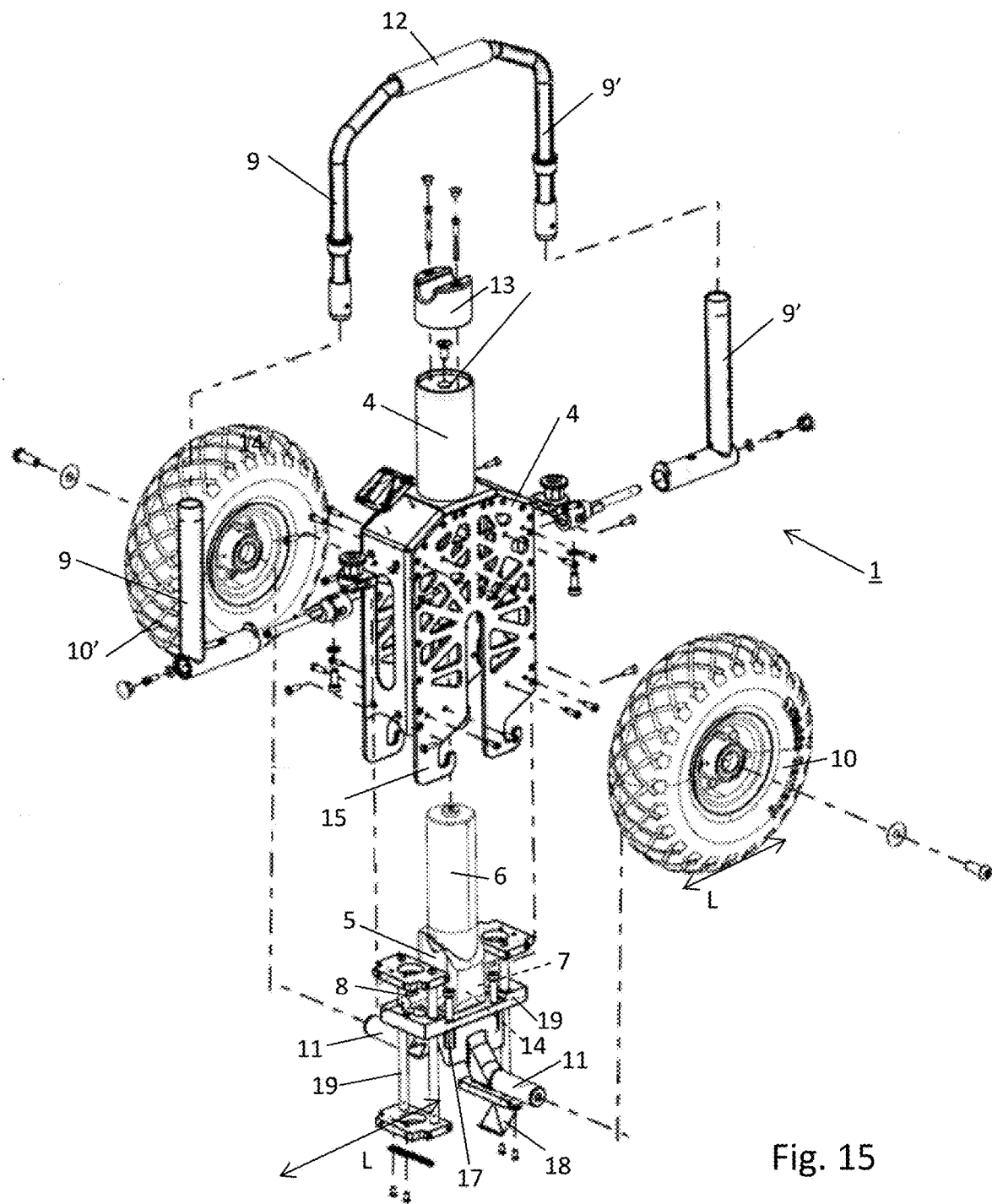
FIG. 15 shows an exploded drawing of a ground manoeuvring device.
Figure 16:
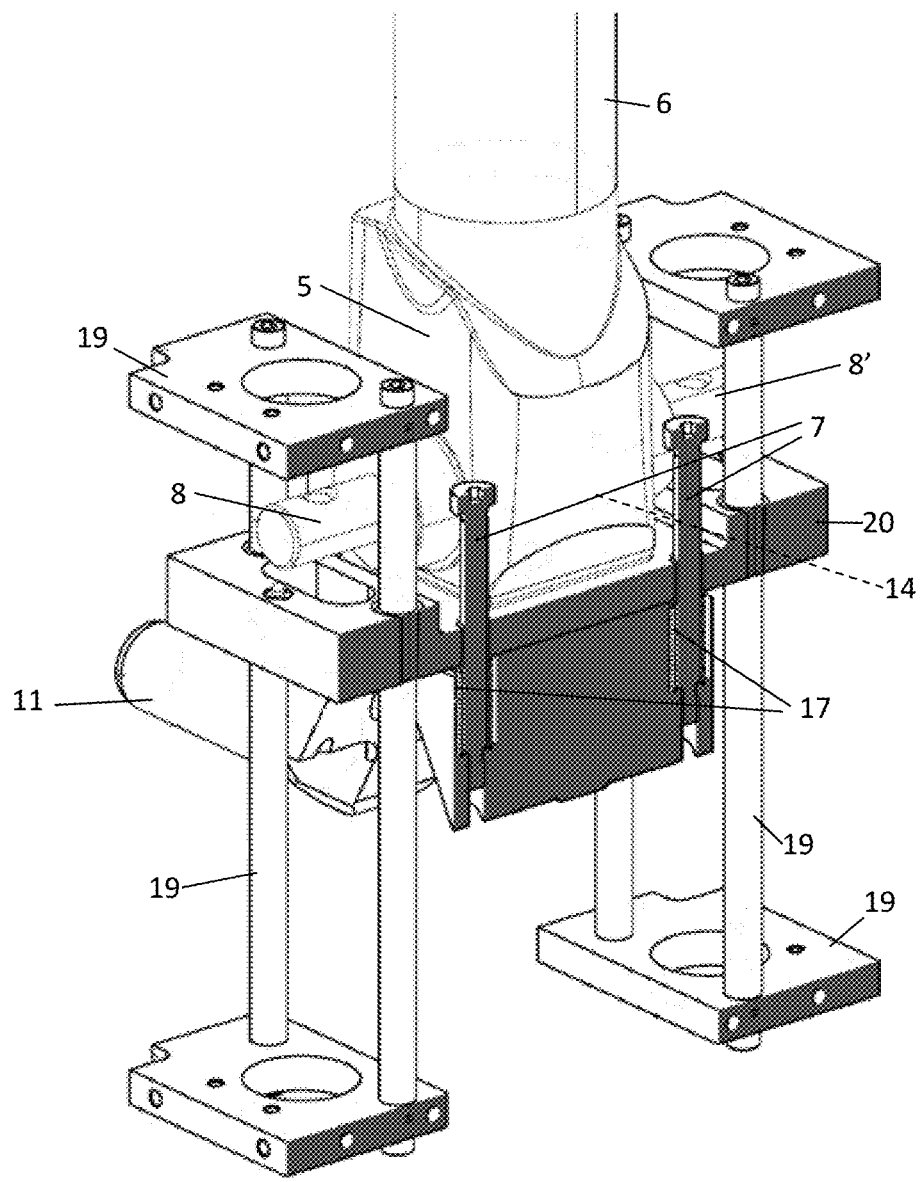
FIG. 16 shows a perspective representation of a hydraulic apparatus of a ground manoeuvering device with a guide device in cross-section.

FIGS. 3 to 14 each show a representation of a mounted ground manoeuvering device 1 according to the invention for jacking up in each case a skid 3 of a helicopter, in order to manoeuvre the latter on the ground, in different states and/or representations. The structure and the mode of functioning can be described with the aid of these figures. FIGS. 15 and 16 also illustrate the internal structure of ground manoeuvering device 1.

Figure 3:
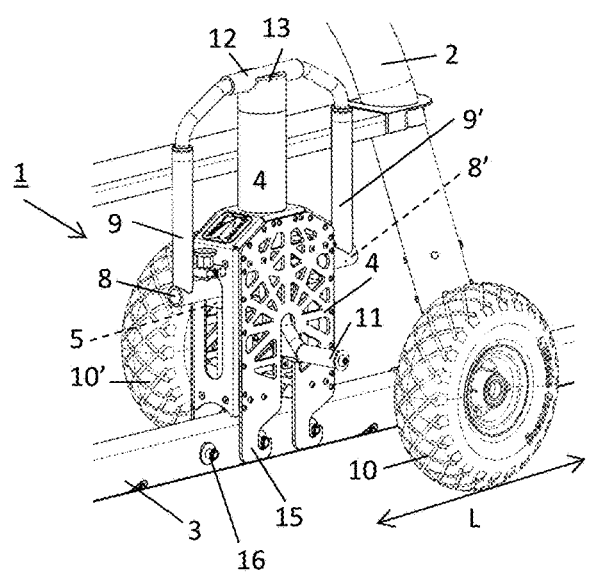
FIG. 3 shows a perspective representation of a ground manoeuvering device mounted on a landing gear of a helicopter, wherein for reasons of clarity one wheel is preferentially shown, in the state with a lower skid.
Figure 4:
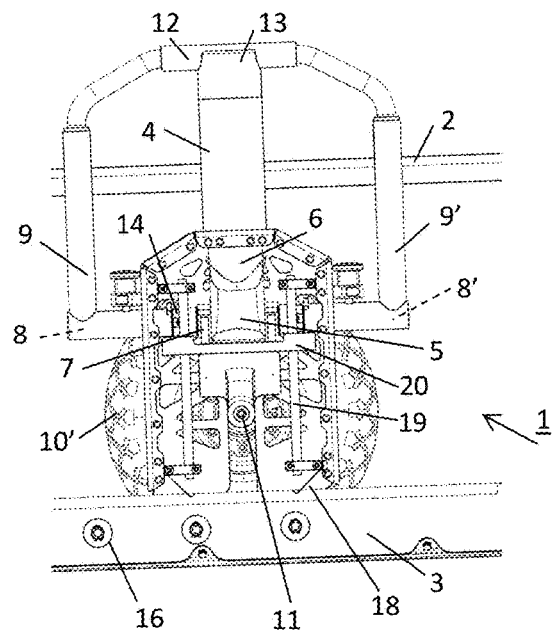
FIG. 4 shows a representation in a side view of a ground manoeuvering device mounted on a landing gear of a helicopter, wherein for reasons of clarity one wheel is shown dismantled, in the state with a lowered skid.
Figure 5:
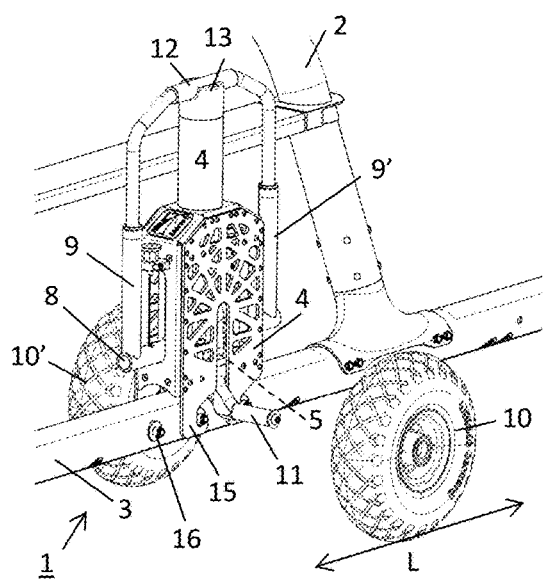
FIG. 5 shows a perspective representation of a ground manoeuvering device mounted on a landing gear of a helicopter, wherein for reasons of clarity one wheel is preferentially shown, in the state with a raised skid.
Figure 6:
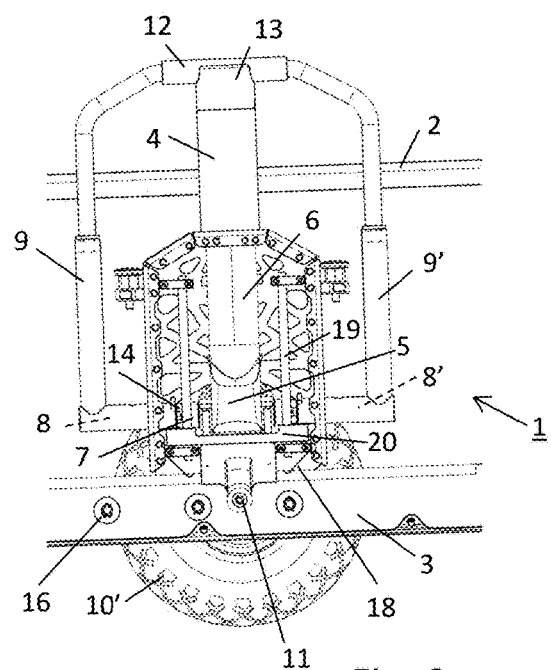
FIG. 6 shows a representation in side view of a ground manoeuvering device mounted on a landing gear of a helicopter, wherein for reasons of clarity one wheel is shown dismantled, in the state with a raised skid.

Ground manoeuvering device 1 comprises housing 4 with a fastening device 15, represented in FIGS. 3 and 5, with which skid 3 can be fastened to housing 4 tension-proof and again detachable, preferably also under tension and therefore vibration-proof. In the present representations, fastening device 15 is constituted in the form of support hooks 15, which engage with a plurality of studs 16 on skid 3. Fastening device 15 preferably comprises at least four such studs or engagement points, wherein at least two engage at each side of a skid 3 and wherein in each case at least two thereof are arranged in front of and respectively behind the wheel axles 11 in wheel running direction L. In order that ground manoeuvering device 1 can be fitted as firmly as possible to skid 3, housing 4 comprises for example one or more pretensioning springs 18, which are put under tension when skid 3 is mounted, as represented in FIGS. 4, 6 and 15. These pretensioning springs 18 ensure a firm hold between housing 4 and skid 3.

Ground manoeuvering device 1 also comprises hydraulic apparatus 5 with an extendable piston 6 and a first engagement shaft 8, to which a lever 9 is fitted in a swivellable manner for the transmission of a torque. Engagement shaft 8 is swivel-mounted in hydraulic apparatus 5 and actuates the latter by an internal gear unit, which is not represented here, whereby the shaft is put into a rotary motion. After approximately 30-40°, a stop is reached and the rotary motion is reset again, the engagement shaft is accordingly swivelled in both directions about its axis. With repeated swivelling or rocking of this lever 9 and consequently of engagement shaft 8, piston 6 is extended from hydraulic apparatus 5 with the aid of the internal gear unit and the hydraulics.

Hydraulic apparatus 5 is fitted movably in housing 4, in such a way that housing 4 can be jacked up vertically when piston 6 is extended. Guide device 19 with a plate 20 fitted linearly movable therein is arranged between housing 4 and hydraulic apparatus 5, which guide device permits a linear displacement of housing 4 with respect to hydraulic apparatus 5 and prevents any other relative movement between them. Such a guide device is represented in detail in FIG. 16 and also in FIGS. 4 and 6 in the installed state. Hydraulic apparatus 5 is fixedly connected to a central plate 20, which can be moved linearly in guide device 19. The latter is connected, for its part, fixedly to housing 4 and therefore to skid 3 by means of fastening device 15. Wheels 10, 10' on axles 11, only the rear one of which is represented, are connected either directly to hydraulic apparatus 5 or, as represented in FIG. 16 and as described later, by four guide screws 7, which rest on retrieving springs 17 and are fitted in a linearly movable manner in guides on plate 20.

According to the invention, engagement shaft 8 and its axis is aligned in wheel running direction L and lever 9 for the actuation of hydraulic apparatus 5 extends in the operating state, represented in FIGS. 9 and 10, in wheel axle direction 11 in the direction of outer wheel 10. Lever 9 comprises a tread section 12, in order to raise fastened skid 3 with hydraulic apparatus 5 onto both wheels 10, 10' while standing conveniently beside the helicopter repeatedly stepping with the foot on tread section 12. The movement of tread section 12 during this operation is represented by a double arrow beneath tread section 12. The pump stroke typically amount to approximately 35°.

One or more retrieving springs or similar means, not represented in the figures, are arranged on or in hydraulic apparatus 5, in such a way that they are placed under a pretension during the stepping motion, as a result of which lever 9 upon being disengaged is brought back again into an initial position.

It has proved to be advantageous if hydraulic apparatus 5 comprises, aligned with respect to first engagement shaft 8, a second, identical engagement shaft 8', to which a swivellable lever 9' is also fitted and connected to tread section 12, as represented in all the figures. The stepping force is thus introduced on both sides into hydraulic apparatus 5, as a result of which further mechanical advantages arise in hydraulic apparatus 5, in particular in the gear unit. In addition, levers 9, 9' are thus only half-loaded and tread section 12, which is designed here as a connecting tube between levers 9, 9', gains stability. Both levers 9, 9' are preferably brought back again into their initial position by means such as retrieving springs. The latter are not represented, being located inside hydraulic apparatus 5.

FIGS. 4 and 6 show the two extreme states of ground manoeuvering device 1. In FIG. 4, piston 6 of hydraulic apparatus 5 is completely retracted and therefore very short. In FIG. 6, on the other hand, piston 6 is fully extended and therefore very long. As a result of the extending of the piston, housing 4 is jacked up with guide device 19 and, with this housing 4, skid 3 fastened thereto. Correspondingly, movable plate 20 firmly anchored to hydraulic apparatus 5 has arrived in guide device 19 of housing 3 at the lower edge. Visible inner wheel 10' is now much lower down than jacked-up skid 3.

The operation of ground manoeuvering device 1 according to the invention is described in the following. FIGS. 7 and 8 show the state during the approach and withdrawal of ground manoeuvering device 1 to and from skid 3, FIGS. 9 and 10 the state for the pumping, FIGS. 11 and 12 the state for the manoeuvering and FIGS. 13 and 14 the state for the lowering.

FIGS. 7 and 8 show complete representations of a ground manoeuvering device 1 in the same state as in FIGS. 3 and 4, mounted, in the state with a lowered skid, in a perspective and a front view.

Housing 4 comprises a locking device 13, which can lock lever or levers 9, 9' in the direction swivelled vertically upwards, preferably at its tread section 12. This locking device can, as represented, merely comprise a recess in housing 4, in which tread section 12 is arranged. Other locking devices, in particular mechanical or magnetic ones, are also conceivable. During manoeuvering and in the hanger, it is recommendable to lock levers 9, 9' in the direction swivelled vertically upwards, for space reasons and to prevent the risk of people passing by tripping.

FIGS. 9 and 10 again show representations of a ground manoeuvering device 1 in the same state as in FIGS. 7 and 8, mounted, but in the operating state, in which skid 3 can be raised.

Proceeding from the situation according to FIGS. 7 and 8, in order to put ground manoeuvering device 1 in the operating state, locking device 13 is released and lever or levers 9, 9' with tread section 12 are brought through 90° from the vertical into the horizontal position, in the direction of wheel axle direction 11 of outer wheel 10, beside the helicopter. According to the invention, this swivelling movement of lever or levers 9, 9' through 90° is possible in both directions in the freewheeling state. No change to the current stroke is carried out during this movement.

Lever or levers 9, 9' are preferably adjustable in length, for example in the manner of a telescope. In this case, tread section 12 moves farther away from ground manoeuvering device 1, as a result of which the lever action during stepping is intensified.

After the swivelling of levers 9, 9' into the horizontal position, ground manoeuvering device 1 is ready for the actuation of the hydraulic apparatus. A user can put himself beside the helicopter and keep stepping on tread section 12 until skid 3 has reached the desired height. As soon as piston 6 is extended to the maximum, further stepping movements no longer have any effect. A stroke covers approximately 35°, +/−5°, which is perceived as comfortable. A restoring element, for example a spring, provides for the return of tread section 12 into the horizontal position after each stepping action, again without effect. When the desired height of skid 3 is reached, tread section 12 on levers 9, 9' can then be brought back into the vertical position in the freewheeling state and can be fixed at locking device 13, as represented in FIGS. 11 and 12. When levers 9, 9' have been extended in the manner of a telescope as suggested, they also fit, in the raised position with extended piston 6 and therefore with raised housing 4, into locking device 13.

This process is repeated with a second ground manoeuvering device 1, which is likewise fastened to second skid 3. The helicopter, standing on the four wheels (10, 10'), can now be brought into equilibrium and thus be manoeuvred. FIGS. 11 and 12 represent the manoeuvering state.

For renewed lowering of skid 3, lever or levers 9, 9' are swivelled farther inwards, preferably through approximately 5-10°, as represented in FIGS. 13 and 14. For this purpose, said lever or levers are swivelled beyond the vertical position in the direction of inner wheel 10', as a result of which a drainage valve 14 of hydraulic apparatus 5, which is correspondingly thus provided, is opened. No further device has to be provided on hydraulic apparatus 5 for this purpose; and the latter does not have to be modified in an expensive way, in order that skid 3 can be lowered again. After the complete lowering of the skid, lever or levers 9, 9' can again be locked, the state according to FIGS. 7 and 8 is again reached. The drainage rate is preferably set fixed in the factory for this purpose. This means that there is no risk of the helicopter striking the ground and being damaged due to excessively rapid draining. Untrained personnel are thus also able to use the device.

In a preferred embodiment of the invention, aligned axles 11 with wheels 10, 10' are not fitted directly to hydraulic apparatus 5, but, as represented in FIG. 16, by means of a plurality, in particular four guide screws 7, which rest on retrieving springs 17, as represented in FIG. 16. The effect of this is that hydraulic apparatus 5 and housing 3 of ground manoeuvering device 1, when the latter is pulled at one of levers 9, 9' or at tread section 12 for transportation, is raised. Ground manoeuvering device 1 can thus easily be pulled, without fastening device 15 being able to stand close to the ground. In the ideal case, ground manoeuvering device 1 can stand on fastening device 15 on the ground if none of levers 9, 9' or tread section 12 are raised.

LIST OF REFERENCE NUMBERS

1 ground manoeuvering device
2 landing gear of a helicopter
3 skid
4 housing
5 hydraulic apparatus
6 piston
7 guide screw
8 8' engagement shaft
9' lever
10 10' wheel
11 axle, wheel axle direction
12 tread section
13 locking device
14 drainage valve (not visible itself)
15 fastening device, support hooks
16 studs
17 retrieving spring
18 pretensioning spring
19 guide device
20 movable, central plate
L running direction of a wheel

The invention claimed is:

1. A ground manoeuvering device for jacking up a skid of a landing gear of a helicopter, in order to manoeuvre the helicopter on the ground, the device comprising a housing with a fastening device, to which a skid can be fastened tension-proof, a hydraulic apparatus with an extendable piston and a first engagement shaft, to which a first lever is attached in a swivellable manner for the transmission of a torque, the piston is extended from the hydraulic apparatus when the first lever is rocked, and wherein the hydraulic apparatus is fitted movably in the housing in such a way that the housing is lifted vertically upwards when the piston is extended, as well as an outer wheel and an inner wheel on two aligned horizontal axles at opposite sides on the hydraulic apparatus, which wheels, after the fastening of the housing to the skid, are arranged beside the skid respectively on the inside and on the outside, wherein the engagement shaft comprises a tread section and is aligned in the wheel running direction and the first lever for operation of the hydraulic apparatus extends, in the operating state, in the wheel axle direction in the direction of the outer wheel, in order to raise the fastened skid onto the two wheels using the hydraulic apparatus while standing conveniently beside the helicopter repeatedly stepping on the tread section.

2. The device according to claim 1, wherein the hydraulic apparatus comprises, aligned with respect to the first engagement shaft, a second, identical engagement shaft, to which a second swivellable lever is also and connected to the tread section.

3. The device according to claim 1, wherein a locking device locks the first lever in the direction swivelled vertically upwards.

4. The device according to claim 1, wherein the first lever with the tread section can be brought through 90° from the vertical into the horizontal position, in the direction of the wheel axle direction of the outer wheel, beside the helicopter and back, so that no change to the current stroke is carried out during this movement.

5. The device according to claim 1, wherein the first lever is swivelled beyond the vertical position in the direction of inner wheel and the hydraulic apparatus comprises a drainage valve which is opened with the first lever swivelled beyond the vertical position.

6. The device according to claim 1, wherein the first lever is variable in length.

7. The device according to claim 1, wherein the skid can be fastened to the housing under tension and detachable again by the fastening device.

8. The device according to claim 7, wherein the fastening device comprises at least four engagement points, wherein two can engage at each side of a skid (3) and wherein in each case two thereof are arranged in front of and respectively behind the wheel axles in a wheel running direction.

9. The device according to claim 7, wherein the housing comprises one or more pretensioning springs, which are put under tension when skid is mounted.

10. The device according to claim 1, wherein a guide device between the housing and the hydraulic apparatus, permits a linear displacement of the housing with respect to the hydraulic apparatus and prevents any other relative movement between the housing and the hydraulic apparatus.

11. The device according to claim 1, wherein the aligned axles with the wheels are fitted to the hydraulic apparatus by a plurality of guide screws, which rest on retrieving springs.

* * * * *